G. R. GALLAGHER.
HOT WATER HEATER.
APPLICATION FILED NOV. 9, 1908.
937,209.
Patented Oct. 19, 1909.
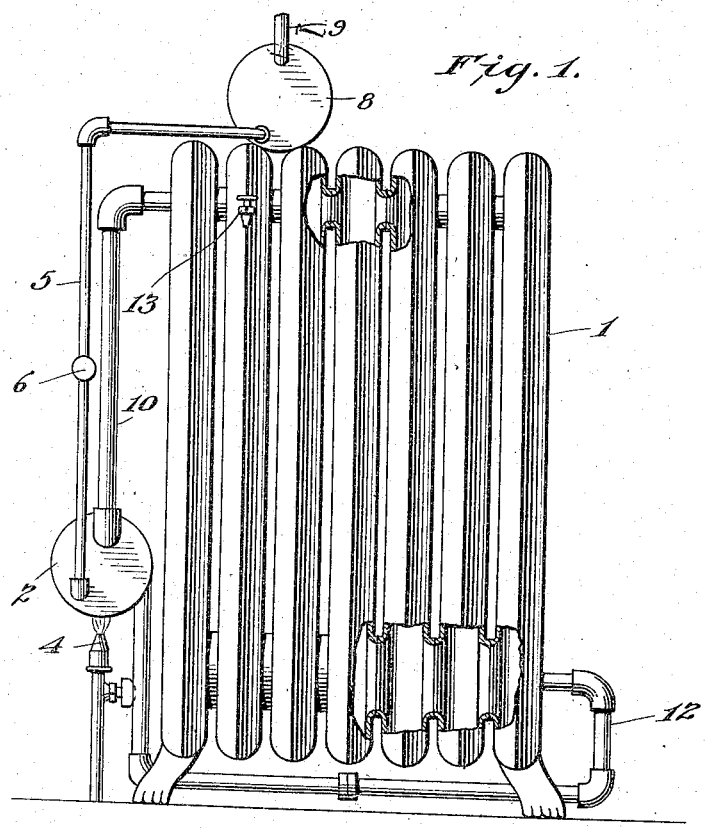
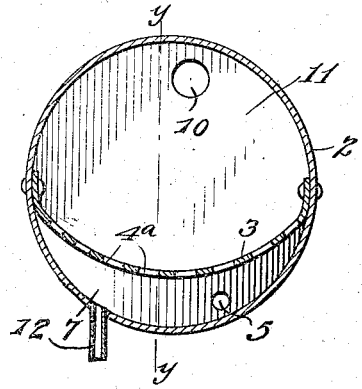
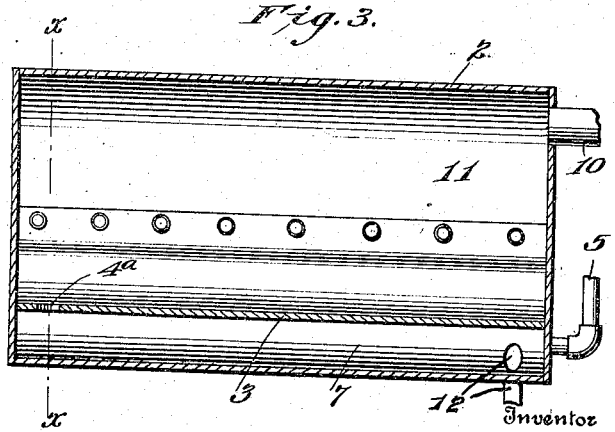
Witnesses
Inventor
George R. Gallagher
By Joshua R. H. Potts
Attorney

UNITED STATES PATENT OFFICE.

GEORGE R. GALLAGHER, OF CHICAGO, ILLINOIS.

HOT-WATER HEATER.

937,209.

Specification of Letters Patent.

Patented Oct. 19, 1909.

Application filed November 9, 1908. Serial No. 461,717.

*To all whom it may concern:*

Be it known that I, GEORGE R. GALLAGHER, a citizen of the United States, residing at Chicago, in the county of Cook and State of Illinois, have invented certain new and useful Improvements in Hot-Water Heaters, of which the following is a specification.

My invention relates to improvements in hot water heaters, and more particularly to a portable device of this character which can utilize any fuel or gas to heat the system, and insure a perfect radiation of heat from the circulating medium.

A further object is to provide an improved heating chamber which insures the rapid heating of the liquid in transit from the radiator back to the radiator.

With these and other objects in view the invention consists in certain novel features of construction, and combinations and arrangements of parts as will be more fully hereinafter described and pointed out in the claim.

In the accompanying drawings, Figure 1, is a view in side elevation partly broken away illustrating my improvements. Fig. 2, is a view in cross section on the line $x$—$x$ of Fig 3; and, Fig. 3, is a view in longitudinal section on the line $y$—$y$ of Fig. 2.

1 represents a radiator which may be made of various forms, and preferably composed of several units so that the radiating surface may be increased or decreased to suit conditions, and I do not confine myself to the particular form of radiator, but may employ any capable of carrying out my invention.

2 represents an improved heating chamber as shown more clearly in Figs. 2 and 3. This heating chamber is shown of cylindrical form, although it may be of other shapes, and is provided with a horizontal partition 3 extending throughout the chamber, and perforated at one end as shown at 4ª. This partition conforms in a measure to the shape of the bottom of the heater, preferably but a short distance therefrom, so as to provide an elongated, shallow and wide lower passage for the water, and as this passage is subjected to the direct heat from any suitable form of burner 4, below the cylinder, the water will be rapidly heated in this passage as the water will be compelled to flow with substantially uniform velocity over the parts of the bottom subjected to heat. The perforations 4ª are arranged in a substantially straight line extending transversely across the partition at one end, and being quite small, project the water upwardly in a number of small streams. An intake pipe 5 having a suitable cock 6 therein connects this lower compartment or passage, which I will designate 7, of the heater with a reservoir 8 to supply the water for the system, and to make up for loss in the operation, and this reservoir 8 may be filled in any desired manner. I have shown a supply pipe 9 connected therewith, although it may be filled by hand, if there be no water supply in the house.

A pipe 10 connects the forward end of the upper compartment 11 of the heating cylinder, with the upper portion of the radiator 1 at one end, and a return pipe 12 connects the lower portion of the opposite end of the radiator with the lower compartment or passage 7 at the forward end of the heating cylinder. An air vent 13 is provided in the upper portion of the radiator to permit the escape of air in filling the system.

The operation of my improvements is as follows: Assuming the system to be empty, the cock 6 is turned and the heating cylinder, the radiator, and all of the pipes are filled with water, the air vent 13 being opened to allow air to escape while the system is being filled. When entirely filled, the cock 6 is closed and the burner 4 lighted. This burner directs the flame against the bottom of the cylinder 2, and will of course heat the water in the lower compartment 7, and due to the differences in temperature, the water in compartment 7 will move along said chamber through the perforations 4ª at the end of the cylinder, and thence through the chamber 11 to the pipe 10, and through the radiator 1 and pipe 12 back to the forward end of the compartment 7, thus insuring a perfect circulation. As is well known, the water returning through pipe 12 will be the coldest in the system, and will receive, in compartment 7, the direct heat from the burner, and as this compartment is comparatively long, wide and thin, or in other words, the liquid is thinly spread over a large area, the water will be rapidly heated and the circulation will be uniform, so that the water will be constantly in circulation, and can be quickly heated to the temperature desired.

A great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

In a device of the class described, a radiator, in combination with a heating chamber, a horizontal partition arranged a short distance above the bottom thereof, and dividing said heating chamber into two compartments, said partition being arranged close to the bottom of the chamber to maintain the water close to the heating surface and perforated at one end, a reservoir, a pipe connecting the reservoir with the lower compartment at the end of the heating chamber opposite from said perforations, a pipe connecting the upper compartment with one end of the radiator a pipe connecting the other end of the radiator with the lower compartment, the perforations in said partition being small to project the water upwardly into the upper compartment in a number of small streams, and extending in a substantially straight line transversely thereof, substantially as described.

In testimony whereof I have signed my name to this specification in the presence of two subscribing witnesses.

GEORGE R. GALLAGHER.

Witnesses:
 ANNA L. EKVALL,
 HELEN F. LILLIS.